UNITED STATES PATENT OFFICE.

JOSEPH KOETSCHET, OF ST. FONS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

NITRO TOLUYLIC ALDEHYDE.

SPECIFICATION forming part of Letters Patent No. 662,075, dated November 20, 1900.

Original application filed June 3, 1899, Serial No. 719,298. Divided and this application filed June 6, 1900. Serial No. 19,199.

(No specimens.)

*To all whom it may concern:*

Be it known that I, JOSEPH KOETSCHET, chemist, of St. Fons, near Lyons, France, have invented certain new and useful Improvements in the Manufacture of a New Nitro Compound of Toluylic Aldehyde, of which the following is a specification.

This invention has reference to the manufacture of a new nitro compound of toluylic aldehyde particularly applicable for use in the manufacture of indigo coloring-matters and intermediate products, more especially in the manner described in my application for patent, dated June 3, 1899, Serial No. 719,298.

I have discovered that when meta-toluylic aldehyde is nitrated a mixture of nitro products is obtained varying in proportion according to the conditions of nitration, and from this mixture I have isolated the crystalline mononitro-toluylic aldehyde, hereinafter more fully described.

In carrying the present invention into effect I preferably proceed under the following conditions of nitration; but it will be understood that these conditions and the proportions of the various reagents may be varied: Two kilos of meta-toluylic aldehyde are dissolved in twenty kilos concentrated sulfuric acid (ninety-eight per cent.) at a temperature of about 40° centigrade, and to this solution is added with constant stirring 1.44 kilos dry nitrate of soda. The temperature is maintained at 40° to 45° centigrade, and when the reaction is finished the nitrated mixture is poured upon ice. The oily mixture of nitro aldehydes is separated by decantation, washed with water, a small quantity of nitro toluylic acid which is formed is removed by carbonate of soda, and the product again washed with water. About two and one-half kilos crude nitro-aldehyde may thus be obtained. The crude nitration production is then fractionally distilled *in vacuo*, and at a pressure of two millimeters nearly the whole distils over between 135° and 145° centigrade. The first two-thirds of the distillate are collected apart and cooled to 0° centigrade, when a crystalline mass of a nitro-aldehyde is formed and removed from the mother-liquor by filtration at 0° centigrade. When pure, this product melts at 64° centigrade, (uncorrected.) The last third of the distillate may be treated separately in the manner described in an application of even date herewith in order to produce another mono nitro toluylic aldehyde. The mother-liquor from the filtration may be resubmitted to fractional distillation until no further crystals are obtained from the fractions, even at a temperature of 10° centigrade. The nitro aldehydes probably contained in the residues have not hitherto been obtained crystalline.

The method of separation from the crude nitrated toluylic aldehyde of the crystalline product melting at 64° centigrade is merely given as typical and may be modified in detail as the proportions of this nitro product in the crude material may require.

The difference between the crystalline nitro toluylic aldehyde melting at 64° centigrade and that constituting the subject of said application of even date herewith is further demonstrated by the different compounds which said nitro aldehydes yield with analin, hydroxylamin, phenylhydrazin, &c., all of which have been prepared by me. The nitro aldehyde of the present application forms a crystalline compound with anilin melting at about 79° centigrade, a crystalline compound with hydroxylamin melting at about 135° centigrade, and a crystalline compound with phenylhydrazin melting at about 131° centigrade. Moreover, on gentle oxidation the nitro aldehyde melting at 64° centigrade yields a corresponding acid melting at 218° to 220°, whereas the nitro aldehyde which forms the subject of said application of even date herewith yields an unknown acid melting at 135° centigrade.

What I claim, and desire to secure by Letters Patent, is—

1. As a new product nitro-toluylic aldehyde which is a derivative of meta toluylic aldehyde and when pure crystallizes in yellowish needles which melt at about 64° centigrade (uncorrected), and which forms a crystalline compound with anilin melting at 79° centigrade, a crystalline compound with hydroxylamin melting at about 135° centigrade, and a crystalline compound with phenylhydrazin melting at about 132° centigrade.

2. As a new product a solid o-nitro toluylic aldehyde having the methyl group in the meta (1:3) position relatively to the aldehydic group and melting when pure at about 64° centigrade, (uncorrected) and forming a crystalline compound with anilin melting at about 79° centigrade, a crystalline compound with hydroxylamin melting at about 135° centigrade, and a crystalline compound with phenylhydrazin melting at about 132° centigrade.

In witness whereof I have hereunto signed my name in the presence of two subscribing witnesses.

JOSEPH KOETSCHET.

Witnesses:
RODOLPHE PFISTER,
EMIL MARQUETANT.